United States Patent [19]

Hawkins et al.

[11] Patent Number: 5,026,791

[45] Date of Patent: Jun. 25, 1991

[54] AROMATIC CARBONATE POLYMER COMPOSITION

[75] Inventors: Christopher M. Hawkins, Evansville; Robert R. Gallucci, Mt. Vernon, both of Ind.; John S. Razzano, Cohoes, N.Y.

[73] Assignee: General Electric Company, Mt. Vernon, Ind.

[21] Appl. No.: 407,371

[22] Filed: Sep. 14, 1989

[51] Int. Cl.⁵ .............................. C08F 283/02
[52] U.S. Cl. .................... 525/464; 524/158; 524/435; 525/474; 528/26; 528/29; 528/32; 528/33
[58] Field of Search ........ 528/33, 29, 26, 32; 525/474, 464; 524/158, 435

[56] References Cited

U.S. PATENT DOCUMENTS

| | | | |
|---|---|---|---|
| 3,189,662 | 6/1965 | Vaughn, Jr. .................. | 524/588 |
| 3,419,635 | 12/1968 | Vaughn, Jr. .................. | 260/824 |
| 4,387,176 | 6/1983 | Freye .......................... | 524/268 |

FOREIGN PATENT DOCUMENTS 0162243  11/1985  European Pat. Off. .

*Primary Examiner*—Melvyn I. Marquis
*Attorney, Agent, or Firm*—Martin B. Barancik

[57] ABSTRACT

A composition comprising an aromatic carbonate polymer wherein in the backbone of said polymer there is a siloxane unit of the structure below

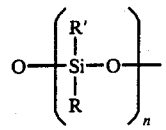

wherein n is an integer of one to about 100, R and R' are each selected from the group consisting of alkyl of one to twelve carbon atoms, inclusive, cycloalkyl of four to eight carbon atoms, inclusive, aryl or six to twenty carbon atoms, inclusive, aryl substituted alkyl of seven to twenty two carbon atoms, inclusive, and A

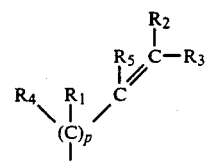

wherein p is an integer of zero to about 4, $R_1$, $R_2$, $R_3$, $R_4$ and $R_5$, are the same or different and are selected from hydrogen, alkyl of one to six carbon atoms, inclusive, and with the proviso that there is sufficient A present that the flame retardance of the polymer is enhanced compared to the polymer without the said siloxane unit.

17 Claims, No Drawings

AROMATIC CARBONATE POLYMER COMPOSITION

BACKGROUND OF THE INVENTION

Aromatic carbonate resins such as polycarbonate resins are thermoplastic resinous materials possessing many excellent physical and chemical properties which render them useful in a wide range of applications. They exhibit for example excellent properties of toughness, impact resistance, heat resistance and dimensional stability, optical clarity or non-opaqueness and physiological inertness. Also of particular interest the aromatic carbonate resins are generally thought to be relatively non-flammable. However, with the additional applications of aromatic carbonate resins and such fields as computer housings, aircraft interiors, and other utilities which require significantly higher levels of non-flammability, flame retardant systems for the aromatic carbonate polymers had to be discovered. Halogenated systems have been found to be successful for flame retardant aromatic carbonates. Additionally, small quantities of flame retardant salts, generally those with a sulphonic acid grouping thereon have been found to also be successful in flame retarding the aromatic carbonates. It has also been found that small quantities of fluorinated polyethylenes such as fibrillar teflons have also been necessary to bring about a very low level of flammability as measured by the underwriter laboratory 94 test system which utilizes the measurement of flaming drips as well as flameout time of the particular plastic being studied. Additionally it has been shown that the thinner the section of aromatic carbonate polymer being flame retardant, the more difficult it is to achieve the maximum class of flame retardation under the UL 94 test system, that is no flamming drips and a flame-out time of 5 seconds or less.

Not only have additive systems been developed for the aromatic carbonate polymers but additionally there have been attempts to modify the polymer backbone to bring about increased flame retardancy. For example in EPA 85 103 914 allylic groups have been added to the phenolic moieties of the dihydric phenol in an attempt to bring about greater flame retardancy. Additionally silicones with Group II A organo-metallic salts are claimed as flame retardant additives for polycarbonate (U.S. Pat. No. 4,387,176). It has also been well known to add siloxane units to the backbone of aromatic carbonate polymer systems to bring about greater processability as well as other features, see Vaughn U.S. Pat. No. 3,189,662 as well as Vaughn U.S. Pat. No. 3,419,635.

It has now been discovered that aromatic carbonate polymers with siloxane units built into the backbone wherein the silicon atom carries a vinyl group successfully flame retards the aromatic carbonate polymer. While so doing the general properties of the aromatic carbonate polymer system such as impact resistance, tensile strength, modulus and transparency in general maintain their usually observed levels or have relatively low reductions.

SUMMARY OF THE INVENTION

In accordance with the invention, there is a composition comprising an aromatic carbonate polymer wherein in the backbone of said polymer there is a siloxane unit of the structure

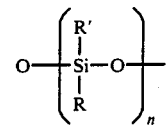

Formula 1 wherein n is an integer of one to about 100, R and R' are the same or different and selected from the group consisting of alkyl of one to twelve carbon atoms, inclusive, cycloalkyl of four to eight carbon atoms, inclusive, aryl of six to twenty carbon atoms, inclusive, aryl substituted alkyl of seven to twenty two carbon atoms, inclusive, and A which is

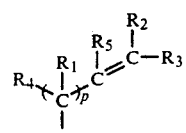

Formula 2 wherein p is an integer of zero to about 4, $R_1$, $R_2$, $R_3$, $R_4$ and $R_5$, are the same or different and are selected from hydrogen, or alkyl of one to six carbon atoms, inclusive, with the proviso that there is sufficient A present that the flame retardance of the polymer is enhanced compared to the polymer without the said siloxane.

DETAILED DESCRIPTION OF THE INVENTION

The polycarbonate copolymers of this invention are prepared in a manner similar to U.S. Pat. No. 3,189,662 included by reference herein. For example, starting with a methylvinyldichlorosilane, Formula 3,

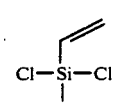

Formula 3 the silane is reacted with water to form the chloro endcap siloxane of Formula 4 below.

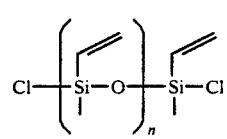

Formula 4

This dichloro endcap material has been reacted with ammonia and a dihydric phenol such as bisphenol-A to form the bisphenol of Formula 5

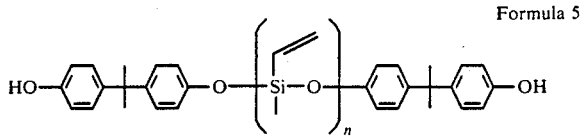

Formula 5

This material is then reacted in typical interfacial manner with a dihydric phenol such as bisphenol-A and phosgene to form the polycarbonate copolymer of the invention as shown by a mer unit of Formula 6, below.

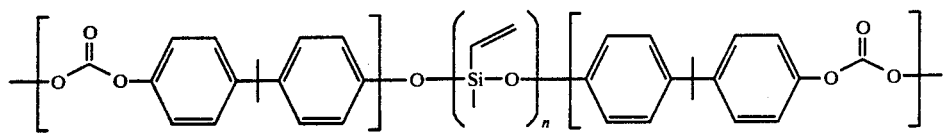

Formula 6

Examples of dihydric phenol as it can be employed are for example, 2,2-bis(4-hydroxyphenyl)-propane (Bisphenol-A); 2,4'-dihydroxydiphenylmethane; bis-(2-hydroxyphenyl)-methane; bis-(4-hydroxyphenyl)methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc. The number of siloxane units can vary from 1 to about 100 depending at least partially upon the silicone fluid employed. The actual process conditions are not particularly significant and as stated before, the processing conditions layed out in U.S. Pat. No. 3,189,662 can be employed to prepare the polymers of this invention. The random copolymer structure of the invention can be varied by changes in the silicone fluid block length and substituents on the silicone as well as by the ratio of dihydric phenol to silane fluid use to prepare capped fluid FIG. 5, see Niznik, G. E., Legrand, D. G. J. Polym. Sci Polymer Symposium 60, 97-119 (1977), incorporated by reference. Examples of changes in the substituents on the silicone would be 25% of the R and R' groups being methyl and 75% being vinyl as opposed to R being 100% vinyl as illustrated in FIG. 3. The polycarbonate copolymers of this invention provide better flame retardant performance than polycarbonate without siloxane units. Additionally the usual properties of the polycarbonate are maintained to a significant extent. For example notched izod impact strength as well as transparency are maintained to a great extent. The polycarbonate copolymers of the invention are especially useful when combined with other known flame retardant materials, for example, sulfonate salts, sulfiimide salts, halogenated sulfonate salts, sulfone sulfonate salts, brominated aromatic compounds including brominated phthalimides, brominated phenyl ethers, brominated aromatic polycarbonates and similar materials, fluorinated alkyl sulfonate salts or other known flame retardant systems. Below are the particular synthetic routes which are detailed to prepare a specific polycarbonate copolymer of the invention. In preparation 1 below the chlorine capped methyl vinyl siloxane fluid was prepared.

PREPARATION 1

The dry 2 L three necked flask was charged with the methylvinyldichlorosilane (1000 g, 7.09 mole) and fitted with a thermometer, mechanical stirrer, addition funnel and a condenser. The addition funnel was charged with a solution of dry acetone (200 g) and water (85.1 g, 4.73 mole). The condenser was sequentially connected to a standard trap at room temperature, a 500 mL round bottom trap which is cooled with dry ice/acetone, a standard trap at room temperature and a T fitting which is connected to a gas dispersion tube immersed into a 4 L flask containing water and to a positive pressure of argon. The water/acetone solution was added to the vigorously stirring solution over 1 hour, during which the temperature was maintained between 10° C. and 30° C. via heat supplied with a heating mantle. The reaction was stirred at 40°-50° C. for ½ h. The bulk of the acetone was stripped off using a water aspirator connected to the three traps as described above. A 1 torr vacuum applied until no acetone and 1% starting material remained determined by NMR and GC. When the cyclic siloxanes are taken into account $^{29}$Si NMR reveals a siloxane block length of 4.1. The material prepared above was then reacted with bisphenol-A to form a bisphenol-A endcap methylvinylsiloxane of FIG. 5.

PREPARATION 2

A dry 5L flask was charged with BPA (285 g) and 3 L methylene chloride (EM OmniSolv, 0.003% H$_2$O) and was fitted with a mechanical stirrer and distillation head. 500 mL of methylene chloride was distilled under Argon. The distillation head was removed and replaced with a 40cm×12cm cold finger condenser which was filled with dry ice/methylene chloride and connected to a positive pressure of argon. The flask was fitted with a stainless steel tube through which was added anhydrous ammonia until the BPA went into solution. Care was taken to minimize the excess of ammonia with was added the vessel. The ammonia inlet tube was replaced with a pressure equalizing addition funnel. The D4.1 chlorine capped methylvinylsiloxane (Preparation 1) fluid (280 g) was diluted to 1 L with dry methylene chloride and was added via the addition funnel so that rapid reflux was maintained. The mixture was stirred at reflux for 1½ hours then acidified with 5% HCl. The organic phase was washed 3x with 1 L of water, then dried with MgSO$_4$.

EXAMPLES 1-3

The bisphenol-A endcapped methylvinylsiloxane from Preparation 2 was then utilized as the base material for making the polycarbonate copolymer by reacting the material with phosgene and further bisphenol-A under standard interfacial phosgenation conditions. The formulation data and resin data for the finished copolymer are provided below in Table I.

TABLE I

| | | Examples | | |
|---|---|---|---|---|
| | Control A | 1 | 2 | 3 |
| Reactor Charge | | | | |
| kg BPA capped fluid | — | 4.81 | 9.63 | 6.0 |
| lbs BPA | 25 | 23.8 | 22.6 | 6.29 |
| ml triethyl amine | 70 | 210 | 210 | 140 |
| g sodium gluconate | 17.5 | 17.5 | 17.5 | 13.6 |
| g phenol | 131 | 131 | 122 | 35.3 |
| L methylene chloride | 35 | 32 | 28 | 30 |
| L water | 30 | 30 | 30 | 30 |
| Theoretical % (wt) | | | | |
| siloxane | 0.0 | 2.0 | 4.1 | 8.2 |
| Resin Properties | | | | |
| MW | 31000 | 29400 | 29900 | 28100 |
| MN | 13400 | 12600 | 12300 | 10100 |
| DISP | 2.32 | 2.33 | 2.43 | 2.79 |
| Tg (°C.) | 151 | 142 | 135 | 121 |

TABLE I-continued

|  | Control A | Examples 1 | 2 | 3 |
|---|---|---|---|---|
| IV (dL/min) | 0.528 | 0.501 | 0.495 | 0.462 |
| Iron (ug/g) | 0.4 | 0.4 | 0.4 | 0.4 |
| Free Ionizable Chloride (ug/g) | 2.0 | 1.2 | 6.2 | 1.2 |
| Total Chloride (ug/g) | 50 | 50 | 50 | 50 |
| Triethyl Amine (ug/g) | 5 | 6 | 7 | 8 |
| Transparent (?) | Yes | Yes | Yes | Yes |

The polycarbonate copolymers made in Example 1–3 were evaluated alone or with a variety of flame retardant additives for flame retardance. Also evaluated was a bisphenol-A polycarbonate. The data are summarized below.

EXAMPLE 4

Flame Retardant Properties of Vinylmethylsiloxane BPA-Polycarbonate Copolymers

EXAMPLE 4

The PC-PMVS copolymers described in Examples 1 and 2 and a polycarbonate control were compounded, injection molded into test specimens, and evaluated in the UL94 test.

|  | polycarbonate | Example 1 | Example 2 |
|---|---|---|---|
| Resin Data |  |  |  |
| Resin |  |  |  |
| % Siloxane | 0 | 2.0 | 4.1 |
| Siloxane Average Block Length | — | 4.1 | 4.1 |
| Formulation Data |  |  |  |
| % Polycarbonate | 100 | 0 | 0 |
| % Example 1 | 0 | 100 | 0 |
| % Example 2 | 0 | 0 | 100 |
| UL 94 Test and Melt Viscosity Data |  |  |  |
| UL94 Rating, 60 mil | V2 | V2 | V2 |
| # V0, V1, V2 & HB Bars | 0 0 5 0 | 0 0 5 0 | 0 0 5 0 |
| Ave. FOT | 7.5 | 9.5 | 4.2 |
| Range of FOT | 2.4–12.1 | 2.6–17.6 | 1.0–10.8 |
| # drips/5 bars | 19 | 17 | 7 |
| UL94 Rating 90 mil | Failed | V2 | V2 |
| # V0, V1, V2 & HB Bars | 0 0 2 3 | 1 1 3 0 | 0 0 5 0 |
| Ave. FOT | 13.9 | 7.8 | 4.3 |
| Range of FOT | 2.0–32.6 | 2.4–13.7 | 1.5–8.5 |
| # drips/5 bars | 22 | 10 | 5 |
| KI (6 min)* | 2900 | 3480 | 1940 |
| TGA char. % | 24 | 27 | 30 |

*KI is a measurement of melt viscosity as per the method described in U.S. Pat. No. 4,436,879, incorporated by reference. As can be seen from the above data, the siloxane copolymers show reduced average flame out time (FOT) and reduced dripping. Additionally the siloxane copolymers show increased char formation as measured by Thermal gravimetric analysis (TGA). Char formation is considered advantageous in the retardance of flammability.

EXAMPLE 5

The PC-PMVS copolymers described in Examples 1 and 2 and a polycarbonate control were compounded with 0.6 phr STB[a], 0.25 phr TB50[b] and were injection molded into test specimens, and evaluated in the UL94 test.
a. soldium trichlorobenzenesulfonate
b. tetrabrominated bisphenol-A polycarbonate wherein the bromine is 25 wt % of the polymer

|  | polycarbonate | Example 1 | Example 2 |
|---|---|---|---|
| Resin Data |  |  |  |
| Resin |  |  |  |
| % Siloxane | 0 | 2.0 | 4.1 |
| Siloxane Block Length | — | 4.1 | 4.1 |
| Formulation Data |  |  |  |
| % Polycarbonate | 100 | 0 | 0 |
| % Example 1 | 0 | 100 | 0 |
| % Example 2 | 0 | 0 | 100 |
| phr STB | 0.6 | 0.6 | 0.6 |
| phr TB50 | 0.25 | 0.25 | 0.25 |
| UL94 Test and Melt Viscosity Data |  |  |  |
| UL94 Rating 60 mil | V2 | V2 | V0 |
| # V0, V1, V2 & HB Bars | 0 0 5 0 | 0 0 5 0 | 5 0 0 0 |
| Ave. FOT | 2.3 | 1.7 | 1.8 |
| Range FOT | 1.0–9.9 | 0.7–4.5 | 0.7–3.0 |
| # drips/5 bars | 6 | 5 | 0 |
| 6 min KI | 3390 | 3390 | 3960 |

As can be seen from the above data, the PC-PMVS copolymers show reduced average flame out time (FOT) and reduced dripping.

EXAMPLE 6

The PC-PMVS copolymers described in Examples 1 and 2 and a polycarbonate control were compounded with 0.15 phr Pt catalyst solution[a] and 5 phr Minusil[b] and were injection molded into test specimens, and evaluated in the UL94 test.
a. (Platinum-cyclovinylsiloxane complex=3—3.5% Pt concentration in cyclic vinylmethylsilox neutral 36585-32-0 Petrarch #PC085)
b. Minusil 15 micron, SiO2 with average particle size micron per Fisher ASTM B330

|  | polycarbonate | Example 1 | Example 2 |
|---|---|---|---|
| Resin Data |  |  |  |
| Resin |  |  |  |
| % Siloxane | 0 | 2.0 | 4.1 |
| Siloxane Block Length | — | 4.1 | 4.1 |
| Formulation Data |  |  |  |
| % Polycarbonate | 100 | 0 | 0 |
| % Example 1 | 0 | 100 | 0 |
| % Example 2 | 0 | 0 | 100 |
| phr Pt catalyst solution | 0.15 | 0.15 | 0.15 |
| phr SiO2 | 5.0 | 5.0 | 5.0 |
| UL 94 Test and Melt Viscosity Data |  |  |  |
| UL94 Rating 60 mil | V2 | V1 | Failed |
| # V0, V1, V2 & HB Bars | 0 0 5 0 | 1 4 0 0 | 0 0 0 5 |
| Ave. FOT | 8.2 | 6.7 | 46.6 |
| Range of FOT | 4.4–12.4 | 3.1–12.8 | 5.9–108.9 |
| # drips/5 bars | 23 | 0 | 0 |
| UL94 Rating 90 mil | Failed | V0 | Failed |
| # V0, V1, V2 & HB Bars | 0 0 1 4 | 5 0 0 0 | 1 2 0 2 |
| Ave. FOT | 18.3 | 3.7 | 17.9 |
| Range of FOT | 4.7–37.6 | 1.3–5.2 | 2.2–67.4 |
| # drips/5 bars | 6 | 0 | 0 |
| 6 min KI | 3020 | 3970 | 3190 |

As can be seen from the above data, the PC-PMVS copolymer which contains 2.0% siloxane shows reduced average flame out time (FOT) and reduced dripping relative to the polycarbonate control. That the PC-PMVS copolymer which contains 4.1% siloxane shows increased average flame out time (FOT) and reduced dripping relative to the polycarbonate control and to the PC-PMVS copolymer which contains 2.0% siloxane demonstrates that the quantity of siloxane units which provide optimum flame retardant optimum performance can change depending upon the specific kind of flame retardant additive present.

EXAMPLE 7

The PC-PMVS copolymer described in Example 1 and a polycarbonate control were compounded with 0.3 phr KSS[a] and 0.20 phr TB50[b] and were injection molded into test specimens, and evaluated in the UL94 test.

a. potassium diphenylsulfonesulfonate
b. tetrabrominated bisphenol-A polycarbonate wherein the bromine is 25 wt % of the polymer

|  | polycarbonate | Example 1 |
|---|---|---|
| Resin Data |  |  |
| Resin /% Siloxane | — | 4.1 |
| Siloxane Block Length |  |  |
| Formulation Data |  |  |
| % Polycarbonate | 100 | 0 |
| % Example 1 | 0 | 100 |
| phr KSS | 0.30 | 0.30 |
| phr TB50 | 0.20 | 0.20 |
| UL 94 Test and Melt Viscosity Data |  |  |
| UL94 Rating 90 mil | V2 | V1 |
| # V0, V1, V2 & HB Bars | 0 0 5 0 | 4 1 0 0 |
| Ave. FOT | 3.4 | 3.9 |
| Range of FOT | 1.1–7.0 | 1.4–12.7 |
| # drips/5 bars | 5 | 0 |
| 6 min KI | 3370 | 2930 |

As can be seen from the above data, the PC-PMVS copolymer shows reduced dripping relative to the polycarbonate control and therefore has a better UL94 rating.

EXAMPLE 8

Similarly prepared were polycarbonate-polysiloxane copolymers (Resins A, B, & C) where some or all of the vinyl groups were replaced with methyl groups. Three resins were prepared, compounded with 0.1 phr $C_4F_9S_3K$, injection molded into test specimens, and evaluated in the UL94 test.

|  | A | B | C |
|---|---|---|---|
| Resin Data |  |  |  |
| Resin |  |  |  |
| % Siloxane (wt) | 2.2 | 4.0 | 2.0 |
| % (mole) dimethyl | 100 | 75 | 0 |
| % (mole) methylvinyl | 0 | 25 | 100 |
| Siloxane Average Block Length | 5.1 | 4.6 | 4.1 |
| Formulation Data |  |  |  |
| % Resin A | 100 | 0 | 0 |
| % Resin B | 0 | 100 | 0 |
| % Resin C | 0 | 0 | 100 |
| phr $C_4F_9SO_3K$ | 0.1 | 0.1 | 0.1 |
| UL 94 Test and Melt Viscosity Data |  |  |  |
| UL94 Rating 60 mil | HB | V2 | V2 |
| # V0, V1, V2 & HB Bars | 0 0 3 2 | 0 0 5 0 | 2 0 3 0 |
| Ave. FOT | 15.9 | 8.0 | 3.1 |
| Range FOT | 1.6–57.7 | 1.2–22.3 | 1.0–4.7 |
| # drips/5 bars | 6 | 5 | 3 |
| UL94 Rating 90 mil | V2 | V2 | V0 |
| # V0, V1, V2 & HB Bars | 0 2 3 0 | 4 0 1 0 | 5 0 0 0 |
| Ave. FOT | 8.9 | 3.7 | 2.7 |
| Range FOT | 1.2–27.5 | 1.1–8.5 | 0.9–4.8 |
| # drips/5 bars | 3 | 1 | 0 |
| 6 min KI | 4860 | 4250 | 3930 |

As can be seen from the above data, vinyl groups impart greater flame retardancy to the copolymers then do methyl groups. As the concentration of vinyl groups increases, flame out time (FOT) decreases and reduced dripping is observed.

EXAMPLE 9

Similarly prepared was a PC.PMVS copolymer (Resin D) containing 2.0% siloxane with an average block length of 4.2. The resin was compounded with 0.04 phr $C_4F_9SO_3K$, injection molded into test specimens, and evaluated in the UL94 test.

|  | polycarbonate | D |
|---|---|---|
| Resin Data |  |  |
| Resin |  |  |
| % Siloxane (wt) | 0.0 | 2.0 |
| Siloxane Block Length | — | 4.2 |
| Formulation Data |  |  |
| % Polycarbonate | 100 | 0 |
| % Resin D | 0 | 100 |
| phr $C_4F_9SO_3K$ | 0.04 | 0.04 |
| UL 94 Test and Melt Viscosity Data |  |  |
| UL94 Rating 90 mil | V2 | V0 |
| # V0, V1, V2 & HB Bars | 1 0 4 0 | 5 0 0 0 |
| Ave. FOT | 3.9 | 2.1 |
| Range FOT | 2.0–6.7 | 0.7–4.0 |
| # drips/5 bars | 4 | 0 |
| 6 min KI | 3440 | 4270 |

As can be seen from the above data, the PC-PMVS copolymer shows reduced average flame out time (FOT) and reduced dripping.

As is clear from the examples, PCPMVS gives substantially better flame retardant performance than polycarbonate when evaluated without additional flame retardants or with a large variety of flame retardant additives. It achieves this improvement in flame retardance while still maintaining substantial impact strength and clarity in comparison to the standard bisphenol-A polycarbonate in admixture with the particular flame retardant system.

What is claimed is:

1. A composition comprising an aromatic carbonate polymer wherein there is a siloxane unit of the structure below

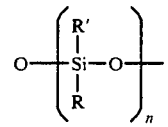

wherein n is an integer of one to about 100, R and R' are each selected from the group consisting of alkyl of one to twelve carbon atoms, inclusive, cycloalkyl of four to eight carbon atoms, inclusive, aryl of six to twenty carbon atoms, inclusive, aryl substituted alkyl of seven to twenty two carbon atoms, inclusive, and A which is

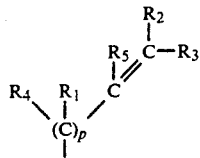

wherein p is an integer of zero to about 4, $R_1$, $R_2$, $R_3$, $R_4$ and $R_5$, are the same or different and are selected from hydrogen, alkyl of one to six carbon atoms, inclusive, and with the proviso that there is sufficient A present that the flame retardance of the polymer is enhanced compared to the polymer without the said siloxane unit.

2. The composition of claim 1 wherein n is from about two to eight.

3. The composition of claim 1 wherein p is zero.

4. The composition of claim 1 wherein $R_1$, $R_2$, $R_3$, $R_4$ and $R_5$ are the same or different and are selected from hydrogen or alkyl of one to six carbon atoms, inclusive.

5. The composition of claim 1 wherein R is alkyl of one to twelve carbon atoms.

6. The composition of claim 2 wherein p is zero and $R_1$, $R_2$, $R_3$, $R_4$ and $R_5$ are hydrogen.

7. The composition of claim 6 wherein R is alkyl of one to twelve carbon atoms inclusive.

8. The composition of claim 7 wherein n is four.

9. The composition in accordance with claim 3 wherein the aromatic carbonate polymer is a bisphenol-A polycarbonate.

10. The composition of claim 4 wherein the aromatic carbonate polymer is a bisphenol-A polycarbonate.

11. The composition of claim 6 wherein the aromatic carbonate polymer is a bisphenol-A polycarbonate.

12. The composition of claim 7 wherein the aromatic carbonate polymer is a bisphenol-A polycarbonate.

13. The composition of claim 1 wherein a flame retardant additive is additionally present.

14. The composition of claim 13 wherein the flame retardant additive is an aromatic sulfonate salt.

15. The composition of claim 13 wherein the flame retardant additive is perfluorinated alkyl sulfonate salt.

16. The composition of claim 13 wherein the flame retardant additive is a halogenated organic material.

17. The composition of claim 13 wherein the flame retardant additive is a combination of a platinum compound with an inorganic filler.

* * * * *

UNITED STATES PATENT AND TRADEMARK OFFICE
CERTIFICATE OF CORRECTION

PATENT NO. : 5,026,791

DATED : June 25, 1991

INVENTOR(S) : Christopher Michael Hawkins; Robert Russell Gallucci John Razzano

It is certified that error appears in the above-identified patent and that said Letters Patent is hereby corrected as shown below:

Column 7,
    Delete line 16.
    Add line 16 "Resin       polycarbonate       Example 1"

Delete line 17.
    Add line 17 "% Siloxane     0       2.0"

Delete line 18.
    Add line 18 "Length     -----       4.1"

Line 41, delete "$C_4F_9S_3K$" and add "$C_4F_9SO_3K$".

Column 8, line 2, delete "then" and add "than".

Signed and Sealed this

Twenty-ninth Day of December, 1992

*Attest:*

DOUGLAS B. COMER

*Attesting Officer*      *Acting Commissioner of Patents and Trademarks*